E. F. ABLITT.
ELECTRODE OF SECONDARY BATTERIES.
APPLICATION FILED OCT. 31, 1918.
1,298,148.  Patented Mar. 25, 1919.
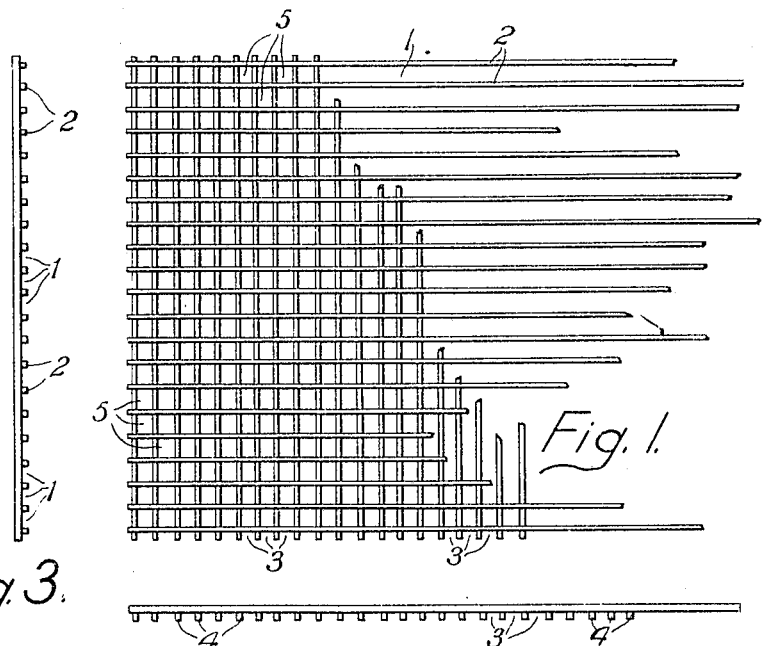
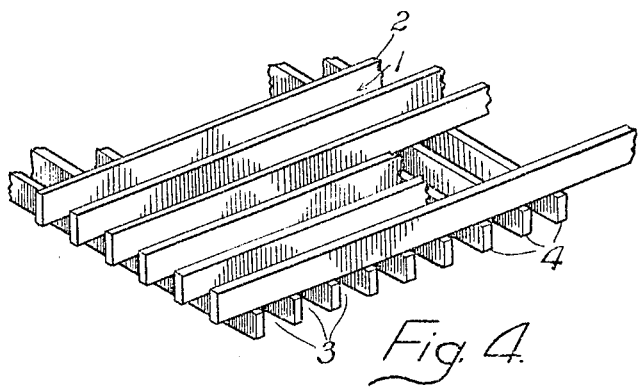
Inventor:-
Edward Frederick Ablitt,
By:- B. Singer, Atty.

UNITED STATES PATENT OFFICE.

EDWARD FREDERICK ABLITT, OF LONDON, ENGLAND.

ELECTRODE OF SECONDARY BATTERIES.

1,298,148.   Specification of Letters Patent.   Patented Mar. 25, 1919.

Application filed October 31, 1918. Serial No. 260,590.

*To all whom it may concern:*

Be it known that I, EDWARD FREDERICK ABLITT, a subject of the King of Great Britain, residing at London, in the county of London, England, have invented a new and useful Improvement in the Electrodes of Secondary Batteries, of which the following is a specification.

This invention relates to improvements in the electrodes of secondary batteries and separators therefor and has reference to electrodes of the pasted type. The object of the present invention is to provide grids or supports for the paste which while capable of accommodating a large proportion of active material will be sufficiently strong to maintain their form when used flat in the usual way and yet, can be rolled up into spiral form with separators between them.

The present invention consists broadly of a grid having slots or uninterrupted recesses bounded by parallel ribs so disposed that parallel uninterrupted ribs upon one surface are at an angle to other parallel uninterrupted ribs upon the other surface of the grid so that the active material is also disposed in uninterrupted strips running across the entire grid. The invention further comprises separators of the same form as the grids which while permitting a free flow of acid or electrolyte will effectively prevent buckling or distortion. This formation can be obtained either by casting or by taking a lead sheet of suitable thickness and slotting its surfaces right across in different directions or by rolling or pressing. The invention further comprises separators of the same form as the grids which while permitting a free flow of acid or the electrolyte will effectually prevent buckling or distortion.

According to the preferred method I take a sheet of lead of the required thickness and cut a series of parallel grooves in its surfaces to a depth approximately midway or slightly more than midway of the thickness of the sheet. The sheet is then turned over and another series of parallel grooves are cut in the other surface but these grooves will run at right angles to the grooves cut in the other surface. Here again the grooves are cut to a depth approximately midway or slightly more than midway of the thickness of the sheet with the result that the form of the grid after the second operation is completed consists of a number of rectangular recesses bounded by ribs which run in one direction upon one surface and in another direction on the other surface.

In the accompanying drawings I have illustrated my invention, Figure 1 being a plan view of an electrode constructed in accordance with my invention.

Fig. 2 is a side edge view thereof.

Fig. 3 is an end edge view thereof, and

Fig. 4 is a perspective view to an enlarged scale.

In these drawings the numeral 1 designates the slots cut or otherwise formed in one surface of the grid or plate and leaving the ribs 2 while 3 designates the slots cut or otherwise formed in the other surface of the plate leaving the ribs 4 with rectangular recesses 5. It will be understood that the paste is compressed into these recesses and between the ribs and it will be found that plates formed in accordance with the invention will accommodate a comparatively large proportion of active material with a comparatively large area of contact between it and the grid or plate.

I may if desirable " grow " the plates to the full extent before inserting them into the cell or battery. That is to say after the grid or support has been formed in the foregoing manner I propose to cover it with paste made up of lead oxid and sulfuric acid in the usual way and after the pasted grid has been allowed to set and dry it is formed negative in a forming bath of sulfuric acid, separators of the same form as the grids being inserted between the plates to prevent distortion during growing. The pasted grid is then in a spongy condition and can be subjected to pressure to increase the cohesion of the active material. The grid is then replaced in a forming tank and peroxidized or formed positive at a medium current. This peroxidization will cause the plate to grow in accordance with well known principles and if the plates are alternately charged and discharged each charging operation being with a slightly heavier current the plate will continue to grow until the active material has been completely peroxidized. The grown plate is then discharged and reversed until it is again in the spongy state when it is removed from the forming tank and pressed. The plate will now have a greater area than formerly and when arranged in the cell can be charged in the usual way and will not " grow " and all danger of buckling and short circuiting will be obviated. The plates may be arranged in the cells in their flat condition or may be rolled with insulators between them in the usual manner.

What I claim and desire to secure by Letters Patent is:—

1. An electrode-grid for a secondary battery including a single integral plate having grooves in its upper face and grooves in its lower face at right angles to the first named grooves.

2. An electrode grid including a single integral plate having grooves in its upper face, the base of such grooves being at right angles to the side walls thereof, the lower face of said plate also having grooves similar to the grooves in the upper face of the plate, such latter grooves running at right angles to the first named grooves.

In testimony whereof I affix my signature in presence of two witnesses.

EDWARD FREDERICK ABLITT.